United States Patent
Tsang et al.

[11] Patent Number: 5,853,465
[45] Date of Patent: Dec. 29, 1998

[54] BLACK-TO-COLOR BLEED ALLEVIATION USING NON-SPECIFIC IONIC, PH, AND COLLOIDAL EFFECTS

[75] Inventors: Joseph W. Tsang; John R. Moffat, both of Corvallis, Oreg.

[73] Assignee: Hewlett-Packard Company, Palo Alto, Calif.

[21] Appl. No.: 821,952

[22] Filed: Mar. 24, 1997

[51] Int. Cl.$^6$ .................................................. C09D 11/02
[52] U.S. Cl. .................................... 106/31.25; 106/31.26; 106/31.27; 106/31.36; 106/31.37; 106/31.38; 106/31.58; 106/31.6; 106/31.68; 106/31.69; 106/31.7; 106/31.86
[58] Field of Search ............................. 106/31.25, 31.26, 106/31.27, 31.36, 31.37, 31.38, 31.58, 31.6, 31.68, 31.69, 31.7, 31.86

[56] References Cited

U.S. PATENT DOCUMENTS

| | | | |
|---|---|---|---|
| 4,963,189 | 10/1990 | Hindagolla | 106/31.52 |
| 5,047,084 | 9/1991 | Miller et al. | 106/31.26 |
| 5,106,416 | 4/1992 | Moffatt et al. | 106/31.27 |
| 5,116,409 | 5/1992 | Moffatt | 106/31.27 |
| 5,133,803 | 7/1992 | Moffatt | 106/31.68 |
| 5,342,439 | 8/1994 | Lauw | 106/31.43 |
| 5,417,749 | 5/1995 | Krishnan et al. | 106/31.26 |
| 5,531,816 | 7/1996 | Wickramanayake | 106/31.65 |
| 5,700,317 | 12/1997 | Adamic | 106/31.6 |
| 5,713,989 | 2/1998 | Wickramanayake et al. | 106/31.25 |
| 5,730,790 | 3/1998 | Rehman | 106/31.28 |
| 5,735,941 | 4/1998 | Feeman et al. | 106/31.28 |

Primary Examiner—Helene Klemanski

[57] ABSTRACT

An ink-jet ink set comprises (a) a microemulsion-based black ink in which the colorant is a water-insoluble black pigment has been chemically modified to impart water solubility by addition of functional groups to form a macromolecular chromophore and (b) at least one non-black (cyan, yellow, or magenta) ink that is a typical aqueous dye-based ink with an agent that increases the ionic strength of the no-black ink and comprises either an inorganic salt or an organic acid; the organic acid is used to adjust the pH of the non-black ink to a value of less than 5. The non-black ink may alternatively comprise a water-insoluble non-black pigment that has also been chemically modified. The macromolecular chromophore-containing ink, or pigment-based ink, of the ink-jet ink set is a microemulsion that contains a substantially water-insoluble organic oil, an organic co-solvent, and water and, optionally, an amphiphile and a high molecular weight colloid. By employing an ink set in which some of the members of the set have a higher ionic strength than the black, microemulsion-based ink, then bleed alleviation can be achieved. When the higher ionic strength ink comes in contact with the lower ionic strength microemulsion ink, the rapid change in ionic strength of the microemulsion causes flocculation of the dissolved modified pigment. The result of the flocculation is that the colorant is precipitated on the print medium. It is no longer capable of diffusion into the other ink, thereby alleviating bleed, nor is it capable of penetration into the medium, thereby resulting in improved color density and edge acuity. The inks described herein also exhibit fast drying times, high waterfastness, and high smearfastness. They also show reduced problems with inter-color bleed and show no halo effect.

16 Claims, No Drawings

BLACK-TO-COLOR BLEED ALLEVIATION USING NON-SPECIFIC IONIC, PH, AND COLLOIDAL EFFECTS

TECHNICAL FIELD

The present invention relates to ink compositions for thermal ink-jet printing in a printer such as Hewlett-Packard's DeskJet® printer.

BACKGROUND ART

Thermal ink-jet printers offer a low cost, high quality, and comparatively noisefree option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected through a conductive trace to a microprocessor, where current-carrying signals cause one or more selected elements to heat up. The heating creates a bubble of ink in the chamber, which is expelled through the nozzle toward the print medium. In this way, firing a plurality of such resistor elements in a particular order in a given primitive forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids.

The tight tolerances of the nozzles (typically 50 mm diameter) require that the ink not clog the nozzles. Further, repeated firings of the resistor elements, which must withstand about 10 million firings over the life of the ink cartridge, can result in fouling of the resistor element. Finally, the ink composition must be capable of interacting with the print medium, especially paper, to penetrate the paper without undue spreading, and the ink composition should be smear and water resistant on the paper.

In commercially-available thermal ink-jet color printers, such as the DeskJet® printer available from Hewlett-Packard Company, a color spectrum is achieved by combining yellow, magenta, and cyan inks in various proportions. The color spectrum achievable by combining a set of colored inks is called the color gamut of the ink set. The color gamut is always a subset of the theoretical available color spectrum.

One reason for not achieving the theoretically available spectrum is that the intensity of a particular ink, as it appears on the print medium, cannot effectively be raised above a particular level. Therefore, colors in the spectrum which need a higher intensity of a particular colorant than can be delivered to the print medium cannot be produced. Increasing the optical density of the colorant increases the achievable intensity of the particular color, which will result in a larger color gamut. The optical density of a colorant as it appears on the print medium depends on a number of factors including the concentration of the colorant in the ink and the volume of ink that can be delivered to the medium. Typically, the concentration of the colorant cannot be raised to increase the intensity on the paper without sacrificing other important aspects of the ink formulation.

Another cause of reduced color gamut is that some of the colorant penetrates into the print medium especially when the medium is paper. When this happens the apparent intensity of the colorant in the printed region is lower than expected based on the amount of colorant delivered to the surface of the print medium. A way of alleviating this problem is to insure that the colorant remains on the surface of the paper or, phrased differently, to prevent colorant penetration deep into the paper fiber.

Inks are known which possess one or more of the foregoing properties. However, few ink compositions are known that posses all of those properties, since an improvement in one property often results in the degradation of another. Thus, inks used commercially represent a compromise in an attempt to achieve an ink evidencing at least an adequate performance in each of the aforementioned properties.

Bleed alleviation between color inks has been investigated in recent years, due to the introduction and subsequent increase in use of color ink-jet printers. A number of approaches have been used, including (1) added salt, (2) added organic acids, and (3) microemulsion inks. Such approaches have employed macromolecular chromophores (MMCs), which are ionic colorants, as the colorant. The ionic colorants comprise water-insoluble pigments, the surface of which are treated to substitute ionic functional groups (acidic or basic) thereonto. This treatment results in water-solubility of a large or macromolecular pigment particle. Such treated particles are called macromolecular chromophores (MMCs).

The added salt results in a salt-out effect and relies on the fact that the addition of a salt, such as NaCl, to a solution significantly increases the solution's chemical potential, primarily the ionic strength. When highly charged particles such as macromolecular chromophores (MMCs) are in contact at the interface of a differing solution of higher ionic strength (e.g., MMC in low ionic strength in one solution and high ionic strength in another), then the salt-out effect takes place, which causes rapid flocculation of MMCs. At this point, MMCs precipitate from solution, thus preventing bleed into the adjacent area.

The added organic acid results in a limited solubility effect, and relies on the fact that when organic acids are present in appreciable amounts in color inks, the organic acids primarily raise the pH as well as the ionic strength of the solution. Upon contact at the interface, anionic MMCs are converted to the free acids, which are considerably less water-soluble than the ionic form, particularly in the case of carboxylated MMCs. These MMCs rapidly precipitate from solution, thereby alleviating bleed into the adjacent area.

Microemulsion inks in which the MMCs are associated with amphiphiles and surfactants, are disclosed in U.S. Pat. No. 5,106,416, issued to John R. Moffatt et al, and U.S. Pat. No. 5,116,409, issued to John R. Moffatt (here, the MMCs are water-soluble dyes), and in U.S. Pat. No. 5,531,816, issued to Palitha Wickramanayake (here, the MMCs are water-insoluble pigments).

Investigations continue into developing ink formulations that have improved properties such as low bleed, high edge acuity, high optical density, fast drying times, good waterfastness, and good smearfastness without sacrificing performance in other necessary properties.

DISCLOSURE OF INVENTION

In accordance with the invention, an ink-jet ink set used in ink-jet printing is provided wherein the color bleed, edge acuity, optical density, drying time, water-resistance, and smear-resistance of the inks are improved through the use of a black microemulsion-based ink-jet ink in conjunction with color inks, whether dye-based or pigment-based, that are provided with increased ionic strength compared to the black ink.

The interaction between the color inks and the black modified pigment-based ink enhances print quality, reduces the halo-effect and controls bleed. The halo-effect occurs when two inks of different chemical potentials including surface tension are printed adjacent each other. At the interface between the two inks, there is apparently a depletion of optical density, resulting in the appearance of a "halo". The present invention alleviates this halo effect.

The colorants suitably employed in the practice of the present invention include all chemically-modified, water-soluble pigments. The chemical modification approach differs from the conventional pigment dispersions, which require solubilizing additions such as amphiphilic polymers and like surfactant species to solubilize water-insoluble colorants. In aqueous solutions, the chemically modified chromophores possess excellent water solubility without the use of other solubilizing additives, such as amphiphilic polymers and surfactants. Black inks prepared from these water-soluble chromophores that are printed on print media evidence black optical density as high as is commonly found in LaserJet® toners and inks.

The black ink-jet ink of the present invention comprises:

(a) a vehicle containing a substantially water-insoluble organic oil, at least one first organic co-solvent, at least one first amphiphile, and, optionally, a high molecular weight colloid;

(b) a substantially water-soluble colorant prepared by chemical modification of water-insoluble organic chromophores (pigments); and (c) water.

All of the above components are present in the ink formulation as a microemulsion, which gives the ink formulation its improved properties.

The color ink-jet ink comprises:

(a) a second vehicle comprising 0 to about 50 wt % of at least one second organic co-solvent and 0 to about 40 wt % of at least one second amphiphile;

(b) about 0.5 to 20 wt % of at least one non-black colorant (cyan, yellow, magenta) consisting essentially of a dye, pigment, or MMC;

(c) an agent for increasing the ionic strength of the color ink, such as an inorganic salt or an organic acid; and (d) the balance water.

Additionally, in further accordance with the invention, a method of ink-jet printing which uses the disclosed inks and exploits the inks' properties is provided.

BEST MODES FOR CARRYING OUT THE INVENTION

By definition, a classical microemulsion consists of swelled micelles in solution. In the present invention, a microemulsion is defined as a stable, isotropic solution that consists of an oil (a substantially water-insoluble organic compound), an amphiphile/surfactant, an organic co-solvent, and water. Regardless of the identity of the micelles, they must be present at a high enough concentration so that the desired physical structure of the microemulsion will form. Traditionally, this minimum microemulsion concentration has been called the critical microemulsion concentration (cmc). If the concentration of micelles in solution is below the cmc, the microemulsion will not form. Without subscribing to any particular theory, it is speculated that the water-soluble chromophore or colorant is dissolved in the aqueous phase in these microemulsions.

In water-soluble dye based inks, color to color bleed control has been demonstrated through the use of the appropriate amphiphiles and surfactants in ink formulations (see, e.g., U.S. Pat. Nos. 5,106,416 and 5,116,409). Dye and micellular and microemulsion interactions greatly reduce lateral migration which would otherwise lead to mixing at the color interfaces: color bleed. This interaction is further improved by the addition of a high molecular weight colloids (see, U.S. Pat. No. 5,133,803).

By employing an ink set in which some of the members of the set consist of inks containing an inorganic salt or an organic acid to increase the ionic strength of that ink and other members contain chemically modified pigments (MMCs) dissolved in a low ionic strength aqueous medium, bleed alleviation can be achieved by precipitation of the MMCs. Further, the MMCs are no longer capable of penetration into the medium, thereby resulting in improved color density and edge acuity. While a typical embodiment will consist of using a MMC-based black ink and dye-based color inks, the underlying flocculation-inducing process is not limited to an ink set using a black modified pigment based inks and color dye-based inks. Likewise, the current invention covers all ink sets which contain inks made from any chemically modified pigment and inks made from any dyes.

The dye-based components of the ink sets disclosed in this invention are intended to encompass any ink made with any aqueous dye that also contains added inorganic salt or a poly-electrolyte molecule (i.e. a single molecule that contains many charge centers). This includes the color inks for the Deskjet® 500, 600 and 800 series printers. Aqueous dye-based inks are well known to those of skill in this art and are well disclosed in many other patents. For this reason, the discussion included below focuses on inks made from chemically modified pigments.

All concentrations herein are expressed in weight percentages, unless otherwise indicated. The purity of all components is that employed in normal commercial practice for ink-jet inks.

MMC-Based Black Ink

A typical formulation for the black pigment-based ink useful in the practice of the present invention includes an oil (about 0.1 to 50 wt %), a co-solvent (0 to about 50 wt %), a colorant (about 0.5 to 20 wt %), an amphiphile (0 to about 40 wt %), a high molecular weight colloid (0 to about 3 wt %), and water. The ink must at least include the oil, the colorant, the amphiphile or surfactant, the co-solvent, and water.

Any substantially water-insoluble organic solvent that is compatible with all the other components of the ink may be employed as an oil in the practice of the present invention. Classes of useful oils include, but are not limited to, glycol ethers, phenyl ethers, poly(glycol)ethers, alkyl ethers, aryl ethers, alkylaryl ethers, alkyl esters, aryl esters, poly(glycol) esters, alkyl phenyl polyethylene oxides, aliphatic polyethylene oxides (POE) (TERGITOLs and BRIJs are available from Union Carbide and ICI America, respectively), water-insoluble acetyleneic polyethylene oxide (insoluble SURFYNOLS, available from Air Products & Chemicals, Inc.), polyethylene oxide block copolymers (PLURONICS, available from BASF), POE esters, POE diesters, POE amines, POE amides, and dimethicone copolyols. The BRIJs, TRI-TONs, TERGITOLs, PLURONICs, and SUR- FYNOLs are more fully disclosed in U.S. Pat. No. 5,106,416. As will be discussed below, many of these classes of oils encompass molecules that are also useful as surfactants in the practice of this invention. The main distinguishing feature between actual examples of molecules useful as oils and examples of molecules useful as surfactants or amphiphiles is that the surfactant (or amphiphile) molecules typically have longer carbon chain lengths and are more water soluble than the oils. Further, an amphiphile or surfactant is more water-soluble in the absence of other co-surfactants and thus is preferred. Specific examples of substantially water-insoluble organic oils that are preferably employed in the practice of this invention include, but are not limited to, ethylene glycol phenyl ether (EPH) and propylene glycol phenyl ether (PPH). The most preferred oil is EPH. The oil concentration may range from about 0.1 to 50 wt %, with 2.5 wt % being preferred. The solubility of the oil in water must be below about 3.0% (the maximum solubility of EPH in water).

The co-solvent may be used as a separate component or as a replacement for the amphiphile/surfactant. This means that in some embodiments of the invention the micelles may contain co-solvent molecules. Classes of compound employed in the practice of this invention include, but are not limited to, aliphatic alcohols, aromatic alcohols, diols, glycol ethers, poly(glycol)ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol)alkyl ethers, higher homologs of poly(ethylene glycol)alkyl ethers, poly(propylene glycol)alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The co-solvent concentration may range from 0 to about 50 wt %, with about 0.1 to 15 wt % being preferred.

For convenience, examples of surfactants are divided into two categories: (1) non-ionic and amphoteric and (2) ionic. The former class includes: TERGITOLs; TRITONs, which are alkyl phenyl polyethylene oxide surfactants available from Union Carbide; BRIJs; PLURONICs; and the SURFYNOLs; POE esters; POE diesters; POE amines; protonated POE amines; POE amides; and dimethicone copolyols. Ionic surfactants such as substituted amine oxides are useful in the practice of this invention. U.S. Pat. No. 5,106,416 discloses more fully most of the surfactants listed above. The non-ionic amphiphiles/surfactants are more preferred than the ionic surfactants. Specific examples of amphiphiles/surfactants that are preferably employed in the practice of this invention include, but are not limited to, iso-hexadecyl ethylene oxide 20 (available from ICI America as ARLASOLVE 200), SURFYNOL CT-111, and TERGITOL 15-S-7. The concentration of the amphiphiles/surfactants may range from 0 to about 40 wt %, with 2.5 wt % being preferred.

Colorants suitable for use in this invention include all chemically modified water-soluble pigments. Black pigments are discussed immediately below, while color pigments are discussed in connection with the color inks, below. The chemical modification imparts water-solubility to the pigment particle. The water-insoluble precursors encompass all organic pigments. Under typical chemical processes, the resulting surfaces consist of carboxylate and/or sulfonate functionalities for anionic chromophores, and ammonium or phosphonium functionalities for cationic chromophores. Depending on the process selected, the chromophore can either be anionic or cationic in character. For example, acidic functionality such as sulfonic acid functionalization results from exhaustive sulfonation with fuming sulfuric acid, while carboxylic acid groups result from either chemical or catalytic oxidative reactions. Conversely, basic chromophores containing ammonium ions result from reductive amidation reactions.

These water-soluble black chromophores are commercially available from colorant vendors such as Cabot Corp. and Orient Chemical. Many pigments are useful in the practice of this invention. The following pigments are useful in the practice of the invention, however this listing is not intended to limit the invention. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101.

For anionic chromophores, the counterions include all alkali metal ions, alkaline earth ions, unsubstituted ammonium ions, and substituted ammonium ions. For cationic chromophores, counterions include all halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexafluorophosphonate, perchlorate, tungstate, molybdate, and silicate ions.

A preferred pigment is a chemically treated carbon black particle with mean diameter ranging from about 5 to 12,000 nm. Colorants of this type result from chemical reactions where solvent-accessible functional groups are derivatized to provide solubilizing groups that render the colorant soluble in water. This resulting macromolecular chromophore (MMC) has a water-solubility similar to that of well known and commercially used water-soluble acidic and basic dyes.

To improve optical density, between 0 and about 3 wt % of a high molecular weight colloid derived from natural or synthetic sources may optionally be added to the ink formulation. Addition of a high molecular weight colloid improves print quality. Examples of high molecular weight colloids employed in the practice of this invention include, but are not limited to, alginates, mannuronic acid, carageenan, guar gum, xanthan gum, dextran, chitin, chitosan, carboxymethylcellulose, nitromethylcellulose, and all derivatives thereof. These colloids are disclosed in U.S. Pat. No. 5,133,803. The preferred high molecular weight colloids employed in the practice of this invention include, but are not limited to, low viscosity, Na alginate. The preferred concentration of the high molecular weight component colloid in the inks of this invention is about 0.25 wt %.

The preferred composition of ink consists of an oil, a surfactant, a co-solvent, and a modified pigment. The preferred oil is EPH or PPH, present at less than 5 wt %. The surfactant is a BRIJ, PLURONIC or TERGITOL, present between about 0.1 and 3 wt %. The co-solvent is a mixture of 1,5-pentane diol, diethylene glycol, and 2-pyrrolidone, the mixture comprising a total of about 5 to 20 wt % of the composition. The modified pigment is a MMC, present between about 3 and 10 wt %. The ingredients are combined and stirred mechanically or emulsified using low power sonication. It is well-known that either method of mixing forms stable microemulsions.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

Color Inks

The color (non-black) inks, typically, cyan, yellow, and magenta, used in the ink-jet ink set of the invention may comprise any of the well-known water-soluble dyes and pigments employed in ink-jet printing. The vehicle employed depends on whether a water-soluble dye or a pigment is used.

Examples of water-soluble dyes include the sulfonate and carboxylate dyes. These are well-known, and have been extensively discussed in other patents, including U.S. Pat. Nos. 5,342,439 and 4,963,189.

The following pigments are useful in the practice of the invention, however this listing is not intended to limit the invention. The following pigments are available from BASF: Paliogen® Orange, Heliogen® Blue L 6901F, Heliogen® Blue NBD 7010, Heliogen® Blue K 7090, Heliogen® Blue L 7101F, Paliogen® Blue L 6470, Heliogen® Green K 8683, and Heliogen® Green L 9140. The following pigments are available from Ciba-Geigy: Chromophtal® Yellow 3G, Chromophtal® Yellow GR, Chromophtal® Yellow 8G, lgrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Heubach: Dalamar® Yellow YT-858-D and Heucophthal® Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperme Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chem: L74-1357 Yellow, L75-1331 Yellow, and L75-2577 Yellow.

As with the black pigment-based inks, low ionic strength microemulsion (nonionics, for example) MMC-based color inks can be formed which are quite stable. Bleed alleviation is achieved through colorant-micellar mediated interactions, such as disclosed in U.S. Pat. Nos. 5,106,416 and 5,116,409, and not by a flocculation mechanism.

The pigment is chemically modified, as with the black pigment, and may be either cationic or anionic. The counterion employed is selected from the same groups as given above for the black pigment.

In the event that a water-soluble dye is employed in the color ink, then the vehicle comprises at least one co-solvent selected from the list given above, in the concentration range given above. The vehicle may also include one or more amphiphiles, whether cationic, anionic, or non-ionic, in the concentration range given above.

The the vehicle comprises at least one co-solvent selected from the list given above, in the concentration range given above. The vehicle may also include one or more amphiphiles, selected from the list given above, in the concentration range given above.

As above, consistent with the requirements for this invention, various types of additives may be employed in the ink to optimize the properties of the ink composition for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or nonacrylic polymers may be added to improve various properties of the ink compositions as desired.

In order to achieve the flocculation desired to alleviate bleed, then the ionic strength of the color ink must be increased. This is accomplished by adding either a simple salt or an organic acid to any or all of the color ink compositions.

The ionic strength of the color ink is increased by at least about 20% relative to the ionic strength of the black ink, preferably at least about 30%, and most preferably at least about 50%. The upper end can range up to several hundred percent, and is limited only by any adverse affect such salt or organic acid might have on the pen materials or on the jetting properties of the ink. The determination of ionic strength may be made, for example, by conductivity measurements, and is not considered to constitute undue experimentation.

Simple salts include the monovalent and multivalent chlorides, fluorides, bromides, nitrates, and tosylates of alkali metals and alkaline earths. Examples of salts include NaCl, CsCl, LiCl, KCl, $MgCl_2$, $CaCl_2$, $Ca(NO_3)_2$, and $Mg(NO_3)_2$. The amount of the salt is in the range of about 0.5 to 10 wt %, based on the total composition of the color ink.

Simple organic acids, mono and polyfunctional acids, and hydroxy acids may alternatively be employed. Examples of acids include acetic acid, citric acid, glycolic acid, succinic acid, adipic acid, tartaric acid, polysulfonic acid, polyvinyl sulfonic acid, and 4-morpholine ethane sulfonic acid (MES, often used as a buffer in ink-jet inks). The amount of the acid is that amount sufficient to adjust the pH of the color ink to a value of less than 5.

In addition to colloidal bleed alleviation (use of surfactants in both black and color inks), further improvement in bleed alleviation is obtained by exploiting the ionic effect of the color inks. This is accomplished by the addition of either salts or organic acids. Added salts such as NaCl affect only the ionic strength of the solution, but not the pH of the solution. Organic acids, on the other hand, affect both pH and the ionic strength of the solution. Both routes generate the same effect on flocculation of MMC-based black inks. Consequently, the term "non-specific ionic, pH, and colloidal effects" is used herein to describe this result.

Printing a color ink prepared in accordance with the teachings above adjacent a chemically-modified, pigment-based black ink results in flocculation of the pigment, which precipitates the colorant out of solution of the black ink and prevents bleed of the black ink into the color ink.

INDUSTRIAL APPLICABILITY

The ink-jet ink sets of the invention are expected to find use in thermal ink-jet printing, especially where the improved ink characteristics disclosed herein, such as high edge acuity, high optical density, fast drying time, low bleed, waterfastness, and smearfastness, are desired.

Thus, there has been disclosed an ink-jet ink set for thermal ink-jet printing comprising (a) a black ink comprising microemulsion of a vehicle, a water-soluble chemically-modified chromophore, and water and (b) a non-black ink comprising an aqueous solution of a non-black chromophore, together with an agent that increases the ionic strength of the non-black ink relative to that of the black ink. It will be apparent to those skilled in this art that various changes and modifications of an obvious nature may be made, and all such changes and modifications are considered to fall within the scope of the invention.

What is claimed is:

1. An ink-jet ink set comprising at least two inks for use with ink-jet printers:
   (a) a black, macro molecular chromophore-based ink comprising:
      (i) a first vehicle comprising (1) about 0.1 to 50 wt % of at least one substantially water-insoluble organic oil, (2) 0 to about 50 wt % of at least one first organic co-solvent, (3) 0 to about 40 wt % of at least one first amphiphile, and (4) 0 to about 3 wt % of at least one high molecular weight colloid;
      (ii) about 0.5 to 20 wt % of at least one black colorant which consists essentially of a water-soluble, black macromolecular chromophore derived from a chemically-treated black pigment; and
      (iii) the balance water, wherein said first ink exists as a microemulsion of said components, and
   (b) at least one second, non-black ink comprising:
      (i) a second vehicle comprising 0 to about 50 wt % of at least one second organic co-solvent and 0 to about 40 wt % of at least one second amphiphile;
      (ii) about 0.5 to 20 wt % of at least one non-black colorant consisting essentially of a water-soluble color dye or a chemically-modified, water-soluble color pigment;
      (iii) an agent for increasing ionic strength of said non-black ink;
   and
      (iv) the balance water.

2. The ink-jet ink set of claim 1, comprising a black, macromolecular chromophore-based ink and three non-black inks: cyan, yellow, and magenta.

3. The ink-jet ink set of claim 1, wherein said colorant, black or non-black, is anionic and is associated with a counterion selected from the group consisting of alkali metal ions, alkaline earth metal ions, substituted ammonium ions, and unsubstituted ammonium ions.

4. The ink-jet ink set of claim 1, wherein said colorant, black or non-black, is cationic and is associated with a counterion selected from the group consisting of halide, sulfate, nitrate, phosphate, sulfonate, carboxylate, carbonate, bicarbonate, borate, tetraborate, tetrafluoroborate, methane sulfonate, methyl benzene sulfonate, phosphite, phosphonate, hexafluorophosphonate, perchlorate, tungstate, molybdate, and silicate ions.

5. The ink-jet ink set of claim 1 wherein said organic oil comprises at least one compound selected from the group consisting of glycol ethers, phenyl ethers, poly(glycol) ethers, alkyl ethers, aryl ethers, alkylaryl ethers, alkyl esters, aryl esters, poly(glycol)esters, alkyl phenyl polyethylene oxides, polyethylene oxide, water-insoluble acetylenic polyethylene oxides, polyethylene oxide block copolymers, polyethylene oxide esters, polyethylene oxide diesters, polyethylene oxide amines, polyethylene oxide amides, and dimethicone copolyols.

6. The pigment-based ink of claim 5, wherein said organic oil is selected from the group consisting of ethylene glycol phenyl ether and propylene glycol phenyl ether.

7. The ink-jet ink set of claim 1, wherein said first organic co-solvent and said second organic co-solvent independently each comprise at least one compound selected from the group consisting of aliphatic alcohols, aromatic alcohols, diols, glycol ethers, poly(glycol)ethers, caprolactams, formamides, acetamides, and long chain alcohols.

8. The ink-jet ink set of claim 7, wherein said organic co-solvent contains at least one compound selected from the group consisting of primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted formamides, unsubstituted formamides, substituted acetamides, and unsubstituted acetamides.

9. The ink-jet ink set of claim 1, wherein said first amphiphile is selected from the group consisting of ionic surfactants, non-ionic surfactants, ionic amphiphiles, and non-ionic amphiphiles.

10. The ink-jet ink set of claim 9, wherein said first amphiphile is selected from the group consisting of alkyl phenyl polyethylene oxides, acetylenic polyethylene oxide surfactants, polyethylene oxide block copolymers, polyethylene oxide, polyethylene oxide esters, polyethylene oxide diesters, polyethylene oxide amines, protonated polyethylene oxide amines, polyethylene oxide amides, dimethicone copolyols, and substituted amine oxides.

11. The ink-jet ink set of claim 1, wherein said second amphiphile is selected from the group consisting of cationic, anionic, and non-ionic amphiphiles.

12. The ink-jet ink set of claim 1, wherein said high molecular weight colloid is selected from the group consisting of alginic acid salts and derivatives thereof, mannuronic acid and derivatives thereof, carageenan and derivatives thereof, guar gum and derivatives thereof, xanthan gum and derivatives thereof, dextran and derivatives thereof, chitin and derivatives thereof, chitosan and derivatives thereof, carboxymethylcellulose and derivatives thereof, and nitromethylcellulose and derivatives thereof.

13. The ink-jet ink set of claim 1, wherein said agent for increasing ionic strength of said non-black ink is either (a) an inorganic salt selected from the group consisting of monovalent and multivalent chlorides, fluorides, bromides, nitrates, and tosylates of alkali metals and alkaline earths or (b) an organic acid selected from the group consisting of mono and polyfunctional acids, and hydroxy acids.

14. The ink-jet ink set of claim 13, wherein said inorganic salt is selected from the group consisting of NaCl, CsCl, LiCl, KCl, $MgCl_2$, $CaCl_2$, $Ca(NO_3)_2$, and $Mg(NO_3)_2$ and wherein said inorganic salt has a concentration within a range of about 0.5 to 10 wt % of said non-black ink.

15. The ink-jet ink set of claim 13 wherein said organic acid is selected from the group consisting of acetic acid, citric acid, glycolic acid, succinic acid, adipic acid, tartaric acid, polysulfonic acid, polyvinyl sulfonic acid, and 4-morpholine ethane sulfonic acid and wherein said organic acid has a concentration sufficient to provide said non-black ink with a pH of less than 5.

16. A method of ink-jet printing comprising printing on a medium with an inkjet ink set having the following composition:
(a) a black, macromolecular chromophore-based ink comprising:
  (i) a first vehicle comprising (1) about 0.1 to 50 wt % of at least one substantially water-insoluble organic oil, (2) 0 to about 50 wt % of at least one first organic co-solvent, (3) 0 to about 40 wt % of at least one first amphiphile, and (4) 0 to about 3 wt % of at least one high molecular weight colloid;
  (ii) about 0.5 to 20 wt % of at least one black colorant which consists essentially of a water-soluble, black macromolecular chromophore derived from a chemically-modified black pigment; and
  (iii) the balance water, wherein said first ink exists as a microemulsion of said components, and
(b) at least one second, non-black ink comprising:
  (i) a second vehicle comprising 0 to about 50 wt % of at least one second organic co-solvent and 0 to about 40 wt % of at least one second amphiphile;
  (ii) about 0.5 to 20 wt % of at least one non-black colorant consisting essentially of a water-soluble color dye or a chemically-modified, water-soluble color pigment;
  (iii) an agent for increasing ionic strength of said non-black ink;
and
  (iv) the balance water.

* * * * *